United States Patent
Janssen, Jr.

(10) Patent No.: US 9,552,516 B2
(45) Date of Patent: Jan. 24, 2017

(54) DOCUMENT INFORMATION EXTRACTION USING GEOMETRIC MODELS

(75) Inventor: William C. Janssen, Jr., Mountain View, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 456 days.

(21) Appl. No.: 13/597,837

(22) Filed: Aug. 29, 2012

(65) Prior Publication Data

US 2014/0064618 A1 Mar. 6, 2014

(51) Int. Cl.
G06K 9/18 (2006.01)
G06K 9/00 (2006.01)
G06F 17/27 (2006.01)

(52) U.S. Cl.
CPC ......... *G06K 9/00469* (2013.01); *G06F 17/271* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 7,069,240 B2* | 6/2006 | Spero et al. | | 705/30 |
| 7,177,483 B2 | 2/2007 | Saund | | |
| 2006/0230004 A1* | 10/2006 | Handley | | G06F 17/2745 706/12 |
| 2007/0118569 A1* | 5/2007 | Kishi | | G06F 17/30011 |
| 2007/0179776 A1* | 8/2007 | Segond | | G06F 17/2247 704/9 |
| 2011/0052075 A1* | 3/2011 | Comay | | G06K 9/00442 382/190 |
| 2011/0078145 A1* | 3/2011 | Chung | | G06F 19/3443 707/737 |
| 2011/0184822 A1* | 7/2011 | Matkovic | | G06Q 20/202 705/18 |

OTHER PUBLICATIONS

Handley, John C. And Namboodiri, Anoop M. "Document Understanding System Using Stochastic Context-Free Grammars," 2005, Proceedings of the 2005 Eight International Conference on Document Analysis and Recognition (ICDAR'05), 5 pages.*
Drivas, Dimitrios and Amin, Adnan, "Page Segmentation and Classification Utilising Bottom-Up Approach," Proceedings of the Third Conference on Document Analysis and Recognition,1995, 6 pages.*
Cloudprint video. See http://youtube.com/watch?v+zHr8gwwJyzg, retrieved from the Internet Aug. 29, 2012.
jQuery Web site, 2006, See http://jquery.com.

(Continued)

*Primary Examiner* — Sumati Lefkowitz
*Assistant Examiner* — Ryan P Potts
(74) *Attorney, Agent, or Firm* — Fay Sharpe LLP (57) ABSTRACT

A receipt processing system includes at least one imaging device which generates an image of a paper receipt. At least one processor programmed to acquire the image of a paper receipt from the at least one imaging device, textualize the data from the acquired receipt image, define specific local partial models based on regular expressions and geometric proximity, extract information from the textualized data according to the local partial models, apply rules to the extracted information, and generate receipt data from the application of the rules.

27 Claims, 7 Drawing Sheets

(56) References Cited

OTHER PUBLICATIONS jQTouch Web site, 2010, See http://jqtouch.com/.
Tornado Web site, 2010, see http://www.tornadoweb.org/.
Fielding, Architectural Styles and the Design of Network-Based Software Architectures, PhD Thesis, University of California, Irvine, 2000.
Wing-Soon Wilson Lian, Heuristic-based OCR Post-correction for Smart Phone Applications, 2009, Honors Thesis.
Riley, Clips: An Expert System Building Tool, in Technology 2001: Proceedings of the Second National Technology Transfer Conference and Exposition, 1991.

* cited by examiner

DOCUMENT INFORMATION EXTRACTION USING GEOMETRIC MODELS

BACKGROUND

The present exemplary embodiments relate to document information extraction and find particular application in connection with systems and methods which extract information from documents and will be described with particular reference thereto. It is to be understood, however, that it also finds application in other usage scenarios, and is not necessarily limited to the aforementioned exemplary embodiment.

Currently, there are numerous methods for capturing data from documents and transferring this information into a software application. For example, it is common practice for accountants to use a paper-based process of capturing receipt data and manually transferring the receipt data into their accounting software. The process involves collecting receipts over some period of time and taking a concentrated block of time to enter data from the receipts into the accounting software. This process, however, is very time consuming and requires a large amount of manual interaction to capture and transfer the document data.

To make this process more efficient, document processing systems are utilized to automatically capture and store the information from documents. In typical document processing systems, information is typically extracted from forms by consulting a model of a form which contains information about what information fields are to be found and where they are located on the document. In this approach, each "expression" of a particular document genre is treated as a separate form, and requires a separate model. Thus, in a workflow with a mixture of different forms, the first step in the document processing would be a classification step to select the correct model to use for a specific document. This would be followed by an extraction step which would use specific information about that form's layout to identify information zones and extract the information from each zone.

However, this approach does not work well for documents not arranged in a known format such as but not limited to receipts. Most receipts are not typical forms with specific areas which get filled in with specific pieces of information. They are better viewed as reports generated by computer programs which can change constantly, to add advertising, coupons, information about special offers, and other such printed material. In addition, there are many different "layouts" for receipts, which would make the task of identifying each "form" and building a model for it is quite expensive and would make the classification task difficult.

The present exemplary embodiment provides a new system and method which overcomes the above-referenced problems and others.

INCORPORATION BY REFERENCE

U.S. Pat. No. 7,177,493 for SYSTEM AND METHOD FOR ENHANCEMENT OF DOCUMENT IMAGES, by Eric Saund, filed Feb. 13, 2007, is hereby incorporated herein by reference in entirety.

BRIEF DESCRIPTION

In accordance with one aspect, a method for processing an electronic image receipt acquired by an imaging device is provided. The method including textualizing data from the acquired receipt image, defining specific local partial models based on regular expressions and geometric proximity, extracting information from the textualized data according to the local partial models, applying rules to the extracted information, and generating receipt data from the application of the rules. The method being performed using at least one processing device.

In accordance with another aspect, a system for processing documents is provided. The system including at least one processor programmed to acquire an image of a paper document with an imaging device, textualize data from the acquired document image, define specific local partial models based on regular expressions and geometric proximity, extract information from the textualized data according to the local partial models, apply rules to the extracted information, and generate document data from the application of the rules.

In accordance with another aspect, a system for processing documents is provided. The system includes at least one imaging device which generates an image of a paper document. At least one processor programmed to acquire the image of a paper document from the at least one imaging device, textualize the data from the acquire document image, define specific local partial models based on regular expressions and geometric proximity, extract information from the textualized data according to the local partial models, apply rules to the extracted information, and generate document data from the application of the rules.

BRIEF DESCRIPTION OF THE DRAWINGS

The exemplary embodiments may take form in various components and arrangements of components, and in various steps and arrangements of steps. The drawings are only for purposes of illustrating the preferred embodiments and are not to be construed as limiting the present exemplary embodiment.

FIG. 3 is an exemplary illustration of the processing of a receipt.

DETAILED DESCRIPTION

The exemplary embodiments provide a system and method which extract pieces of data from non-form type documents, i.e. documents without a specific model or layout. Specifically, the exemplary embodiments define specific local partial models based on regular expressions and geometric proximity and utilize those partial models to identify specific pieces of data peculiar to the document genre.

Figure 1:
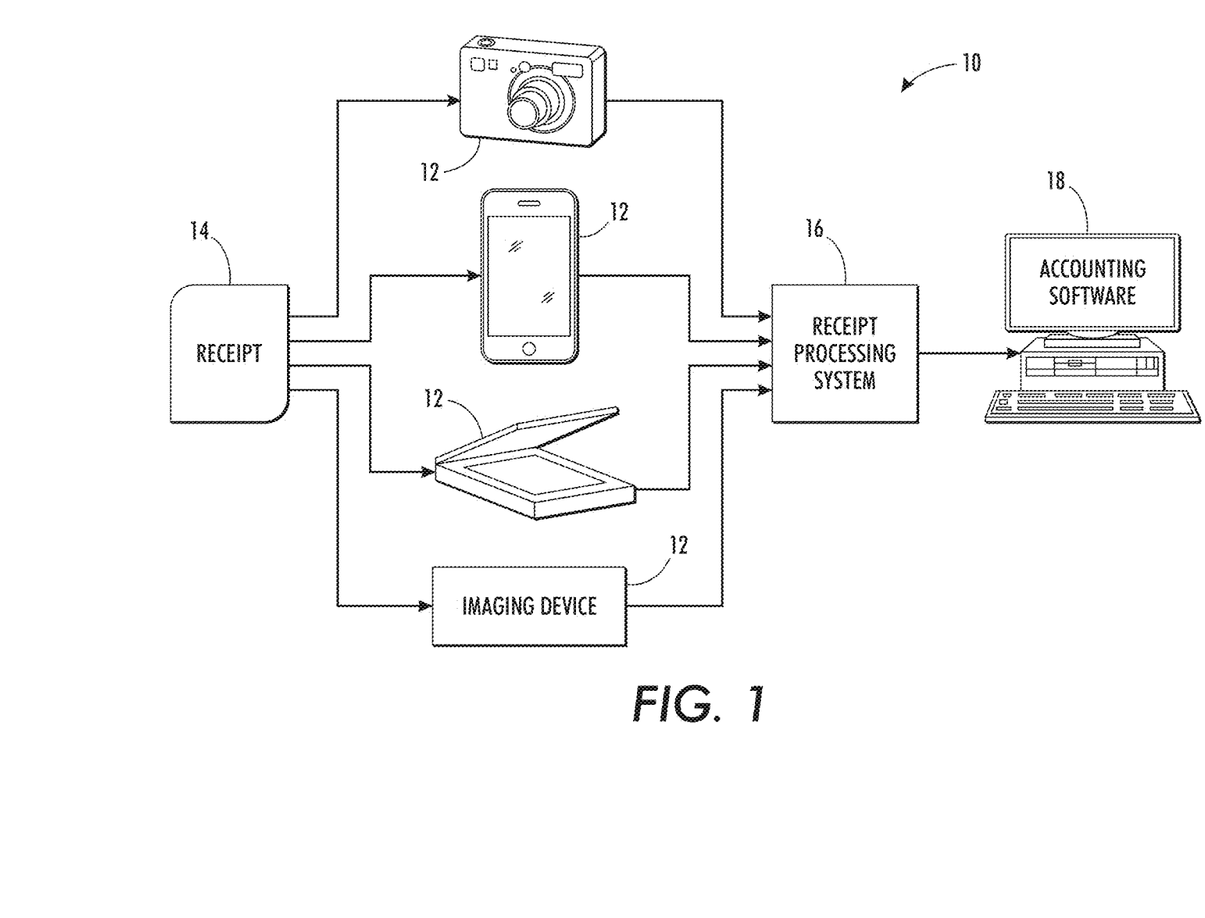
FIG. 1 is a diagrammatic illustration of a document processing system.

With reference to FIG. 1, an exemplary document processing system 10 for extracting data from documents of the present application is illustrated. The system 10 includes one or more imaging devices 12 which convert one or more paper documents 14 into digital images for document processing. In one embodiment, the imaging device 12 may be one or more of a camera, a cell phone, a scanner, and the like. In another embodiment, the one or more paper documents 14 may be one or more of a cash register receipt, book cover, cereal box, price tag, train ticket, fire extinguisher tag, parking receipt, ATM receipt, and the like. It should be appreciated that the information on the paper documents can be arranged in a creative profusion of documents layouts, that is, the information may be scattered almost anywhere on the paper document and use assorted fonts, spacing, sizes, and the like. It should also be appreciated that the imaging device 12 may be any device capable of converting paper documents into digital images. The digital images can be formatted in bmp, pdf, tif, jpg, gif, png and the like. In an exemplary embodiment, the imaging device 12 is cellphone camera which converts one or more register-tape receipts into a document image suitable for text extraction and processing.

After the one or more paper documents are converted to digital images, the imaging device 12 transmits the digital files to a processing system 16 which processes and extracts data from the digital images. In an exemplary embodiment, a receipt processing system processes and extracts receipt data from digital images of register-tape receipts. In one embodiment, after receiving a digital image, the processing system 16 may authenticate the sending user, assign the digital images a location, and store the digital image in that location. In another embodiment, the processing system 16 further processes the digital image by recognizing and tagging textual elements (words and numbers) and metatextual elements (bar codes, QR codes, XEROX® DATAGLYPHS®, logos, etc.) in the image with their content. For example, the digital image may be processed by an OCR system to extract the text from the digital image. In another embodiment, the processing system 16 extracts data such as names, addresses, phone numbers, check numbers, account numbers, dates, currency amounts, graphics, logos, and the like from the textual and metatextual elements. In another embodiment, the processing system 16 utilizes the extracted data to assign or classify the paper document 14 to a class. In another embodiment, the processing system 16 then applies one or more rules to extract further data from the digital image or apply application-specific rules to the extracted data.

In another embodiment, once a digital image is processed, the data may be transmitted to a further destination and/or stored in a database and/or stored within a file system. For example, once the digital image is processed (e.g. document acquisition, image textualization, information extraction, document classification, application of rules, etc.), the corresponding data is transmitted to an associated application 18. For example, receipt data extracted from the digital images of register-tape receipts is transmitted to accounting software for further processing, viewing, editing, and the like.

Suitably, the document processing system 10 communicates the digital images and data via a communication network, such as the Internet, a local area network, a wireless network, and the like. However, in other embodiments, the document processing system 10 may communicate the digital images and data via a data bus, such as USB, FIREWIRE®, etc., a storage medium, such as a CD, thumb drive, etc., and the like.

Figure 2:
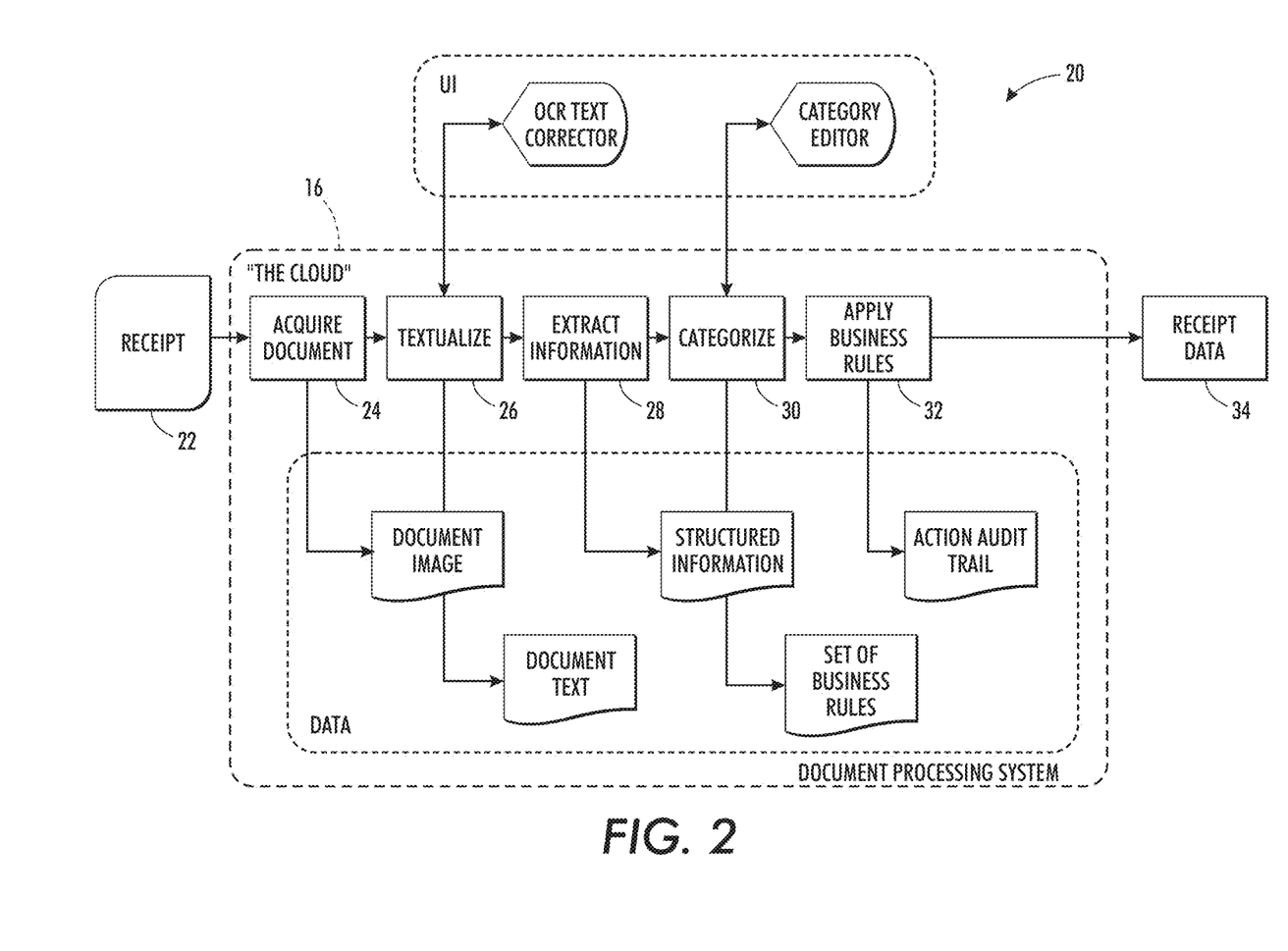
FIG. 2 is an illustration of a diagram of a method for processing documents.

With reference to FIG. 2, a diagram of a system 20 for processing documents is illustrated. The system 20 is configured to receive a digital image 22 representing a paper document, such as a receipt image, received from an imaging device, such as a cellphone. The digital images can be formatted in bmp, pdf, tif, jpg, gif, png and the like. As mentioned above, the digital image can be arranged in a creative profusion of documents layouts, that is, the document may be scattered almost anywhere on the information and use assorted fonts, spacing, sizes, and the like. As shown in FIG. 2, the digital image is received at a document processing system 16, such as a receipt processing system, which in one embodiment is located in a cloud infrastructure. In other embodiments the system may be located at a single location.

As used herein, "cloud" may refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and reside within personal computers, local or "on-premise" servers, having at least one processing device such as a microprocessor, graphics processor among other processing devices and associated components. In general, cloud computing may be employed to perform services in a dissociative way, i.e., the client may not know where the service is performed as long as the service is performed with the expected quality of service.

The system 20 further includes acquiring and processing the digital image with a document acquisition and processing module 24. In one embodiment, the document acquisition and processing module 24 authenticates the digital image 22, authenticates the user, assigns a location to store the digital image 22, and/or stores the image 22 properly in that location. When an authenticated document image arrives at the document processing system 16, the document acquisition and processing module 24 creates a new folder for the image, and stores the image in that folder, using bmp, pdf, tif, jpg, gif, png and the like formats.

The document acquisition and processing module 24 further processes the image 22 for input to an optical character recognition (OCR) subsystem. This processing includes orientation correction, deskewing, normalization of lighting differences across the surface of the document, removal of background artifacts and noise elements, and the like.

Since the resolution of input images can vary widely, the document acquisition and processing module 24 dynamically determines the likely characters on the page so that their sizes can be measured. This accomplished by applying a clustering algorithm to the connected components of the image 22, which generates two or more clusters of decreasing size. The largest of these clusters is typically noise speckles and dust on the image 22. The second largest is taken as the cluster of character images. The document acquisition and processing module 24 measures the average width and height of the components in this cluster and uses that measurement as the average width and height of the characters on the image 22.

The document acquisition and processing module 24 also corrects the orientation of the digital images 22. Most deskew algorithms work only on a small range of skew angles, so radical skew angles, such as 90 degree rotations, are processed separately. Further, typical OCR sub-systems accept right-side-up or up-side-down images, so document acquisition and processing module 24 recognizes "sideways" images and correct them. The document acquisition and processing module 24 determines the orientation of the image because typical frequently-occurring characters in English text tend to be taller than they are wider. The document acquisition and processing module 24 utilizes the extracted connected components which represent characters, and calculates the average aspect ratio of those components. If the average is "wider" than it is "tall", the image is taken to be "sideways" and the document acquisition and processing module 24 rotates the digital image 22 by 90 degrees.

The document acquisition and processing module 24 then measures the skew from horizontal of the document image, using a standard and commonly known Hough transform. The document acquisition and processing module 24 further checks if the average height of character connected components is less than some limit (currently 20 pixels), and if so, the document acquisition and processing module 24 supersamples the image 22 by 2× to increase the average character size. The document acquisition and processing module 24 then deskews the supersampled image using the skew angle measured previously.

Once the digital image 22 is deskewed and in some cases supersampled, the document acquisition and processing module 24 removes the background and normalizes the illumination across the foreground content of the image. To accomplish this, the document acquisition and processing module 24 utilizes an iterative technique that estimates and interpolates the color distribution of light background across the image 22, and then applies a combination of high-pass filtering and distance measures on the hue-saturation-brightness values of individual pixels. Finally, the document acquisition and processing module 24 binarizes the image using a simple thresholding technique, thus creating a version suitable for OCR input.

The system 20 further textualizes the digital image 22 with a textualization module 26. When a digital image 22 is received, textual elements (words and numbers) and metatextual elements (bar codes, QR codes, XEROX® DATAGLYPHS®, logos, etc.) in the image 22 are recognized and tagged with their content. Specifically, the binarized document image is processed by the textualization module 26 to extract meaningful textual content. The textualization process includes OCR to extract apparent text, along with logo recognition to turn logo art into text, barcode decoding to turn barcodes into text, QR code decoding to turn QR codes into text, and the like. The extracted text is tagged with its location on the digital image 22, and the textualization module 26 assigns a recognition confidence value between 0 and 1. Text extracted from an image, such as a logo or barcode, is given the bounding box of that image as its location. Note that the OCR process used produces the bounding box as an output; other information, such as font types and sizes and information on bold or italic faces would are also output. Confidences on recognition accuracy of word and character elements are also utilized if the textualization module 26 further processes the image to improve accuracy. It should also be appreciated that the textualization module 26 also enables the user to correct inaccurate work or character elements.

For example, the textualization module 26 processes the image 22 through the OCR sub-system to extract the text. The textualization module 26 convert this information from the OCR system's proprietary format to a hOCR format standard for OCR output, which enables the textualization module 26 to effectively separate the particular OCR sub-system from the rest of document processing system 16. Bounding box information is present for each word, using the "bbox" hOCR tag. Character and word confidences are present in the hOCR, using the optional "x confs" and "x wconf" tags.

As stated above, current production document processing starts with a classification step, to identify the correct information extraction techniques for a given document, followed by application of those techniques. However, such current document processing system cannot process a wide variety of documents, and would function incorrectly on instances from subgenres which haven't been encountered before. The exemplary embodiments rely on a generic model of paper documents, such as receipts and invoices, which are based on text features and certain geometric relationships between those features.

The system 20 further extracts information from the extracted text and character elements with an information extraction module 28. The information extraction module 28 start by applying context-free regular-expression patterns to identify high-value information fragments, called "entities", in the OCR text. Entities are typically structured pieces of information, such as telephone numbers, dates, URLs, names and addresses, currency amounts, email addresses, and credit-card numbers. The information extraction module 28 also searches for certain key phrases like "TOTAL AMOUNT" or "DATE PAID" which help to disambiguate other entities. These phrases are typed with the kind of related entity it would help to disambiguate; for instance, "DATE PAID" would be a "date" key phrase.

For example, the system 20 identifies the lowest-level entities via pattern recognition techniques and groups these lowest-level entities according to geometric incidence rules to aggregate the lowest-level entities into larger-scale entities. The system 20 then identifies larger groups of the larger-scale entities based on the geometric relationships between the large-scale entities and finds specific document information from the identified larger groups. It should be appreciated that the geometric incidence rule are genre specification such as document genres (i.e. store receipts, train tickets, and the like).

As shown in FIG. 3, a photo of a grocery store receipt is captured by a cellphone in FIG. 3(a). FIG. 3(b) illustrates the receipt images rotated, deskewed, binarized, and cropped ready for OCR. FIG. 3(c) illustrates the receipt image including highlighted recognized entities and discovered limits of line-items region. As shown, the recognized entities include a number of amounts and amount keywords, as well as a date, a timestamp, a phone number, and an Internet domain.

To allow for OCR errors, the information extraction module 28 employs a regular expression engine which supports "fuzzy" matching for finding recognized entities. This allows the information extraction module 28 to specify regular expressions which match sub-strings within a specified Levenshtein distance of the expression. In addition, the patterns are written to allow for certain typical OCR errors, such as confusing zero with capital or lowercase O.

The information extraction module 28 also groups each key phrase entity with another entity of the proper type, if the key phrase occurs in a specified geometric relationship with the other entity, with no intervening text. The relationships currently used are "RightOf", "LeftOf", "Below", and "Above". For instance, the information extraction module 28 utilizes a timestamp as a "date" key phrase entity and requires it to have a "RightOf" relationship with any date it applies to. This assists the information extraction module 28 to identify the actual date of the receipt, as opposed to an expiration date or special offer date that might also appear on the receipt. Similarly, "amount" key phrases that indicate a total are required to appear "Above" or "LeftOf" a currency amount entity in order to be associated with it. As shown in FIG. 3(d), the digital image 22 illustrates a number of groupings found in our receipt image. For example, the rectangles indicate places where a key phrase has been grouped together with another factoid, in this case dollar amounts.

These groupings, along with the other entities identified, are stored by the information extraction module 28 in a file, using an XML format and the like. The bounding box on the image of each entity is stored along with its data and type and a confidence value. The confidence value is simply the minimum of the word OCR confidences for all of the words in the entity. This file is used as input to the categorization module 30 and the rules application module 32.

To support line item table parsing, the information extraction module 28 identifies the region of the receipt containing the line items. The information extraction module 28 utilizes a simple algorithm which works for cash register receipts, but is suboptimal for large-form receipts. The information extraction module 28 first identifies the topmost currency amount entity, and uses the top of its bounding box as the top of our list items region. The information extraction module 28 then searches for the first currency amount entity below it that is also tagged with an amount keyword, such as "total" or "subtotal". The top of that entity is used as the bottom of the list items region. The left and right sides of the receipt form the left and right sides of the region. FIG. 3(c) illustrates these bounds identified in our receipt image. This information is then stored in the XML file along with the other entity information.

The remainder of the method undertaken in system 20 is rules-based. Specifically, the data processing system 16 applies two distinct stages of rules-based processing. First, the system 20 categorizes the data extracted from the digital image by a categorization module 30. Using the results of the information extraction module 28, the document is assigned to a class. Each class has its own rules which are applied to corresponding documents. The class assigned may be an existing class, or this process may start a new class created by the user.

For example, the categorization module 30 distinguishes between the two types of documents handled by the document processing system 16, invoice and receipts. Specifically, the categorization module 30 searches for features, textual keywords and factoid patterns, that tends to be present in one category more often than other categories. Each of these features found contributes evidence towards or against one type or the other. A classification rule integrates the results of the search and generates with a total categorization score.

Once the document has been recognized as a particular category, the rules application module 32 applies a set of rules which extracts a uniform set of data from the digital image For instance, the rules application module 32 searches for the total amount the receipt, along with the date of the receipt and any tax charged. The rules application module 32 accomplishes this by examining the factoids within the extracted data. For instance, one rule locates the currency amount tagged with a currency amount key phrase that contains the word "total" that is lowest on the receipt image, and identifies it as the total of the receipt. The resulting data 34 generated from the rules application module 32 may be transmitted to a further destination and/or stored in a database and/or stored within a file system.

The results of information extraction utilizing the document processing system 16 from the sample receipt of FIG. 3 is:

Computed information:
Date: Apr. 6, 2011
Total: 22.47
Tax: 0.86
Vendor: PIAZZA'S DELI™
Category: 581209—Delicatessens For example, a feature of a receipt is the vendor or supplier who provided it. The rules application module 32 includes rules which take any business names, telephone numbers, or URLs found on the receipt and consult a business directory. This directory contains a list of local businesses, drawn from a nationwide list, which the user can edit or extend. For each business listed, the directory contains its addresses, accounting categories such as "Grocery" or "Hardware", nicknames (often found on receipts), phone numbers, and URLs. If the phone number or URL on the receipt is found to match one of the businesses in the directory within a small edit distance (which varies depending on the length of the text string), that business is assigned as the "vendor" of the receipt. The accounting categories for that vendor are also assigned to the receipt. In the above example, "Vendor" and "Category" derived from the store's telephone number. The particular "Date" of the sample receipt was accepted as the receipt date because of the associated timestamp; receipts which include return information often have multiple dates, including both the date of the original purchase and the date of the return.

The rules application module 32 also includes user-specified rules. Users can define their own rules, which consist of preconditions and resultant "service actions", which are drawn from system-provided application libraries. These rules are stored in an XML-format file which is read by the rules application module 32 which transforms the XML representation of each rule to a CLIPS equivalent, and adds those rules to the rule base for that user. These rules typically use the uniform set of data extracted in the rules application module 32, though the full set of extracted entities is also available to user rules.

When a document is detected which matches both a user rule's set of preconditions, and the preconditions for any service actions associated with that rule, the action specified is taken on that document. Note that this can be triggered by adding a receipt, but also by changing the preconditions or actions of an existing user rule to match receipts already in the database. For example, user rules take action through the use of "service modules". Each service module encapsulates interaction with a specific external service, such as GOOGLE DOCS® or QUICKBOOKS® Online. Each service module exports resulting data 34, such as posting data to a specific spreadsheet or account. Each action specifies preconditions, consisting of the various kinds of data it needs to effectively execute. These preconditions are automatically added to the preconditions of each user rule.

Figure 4:
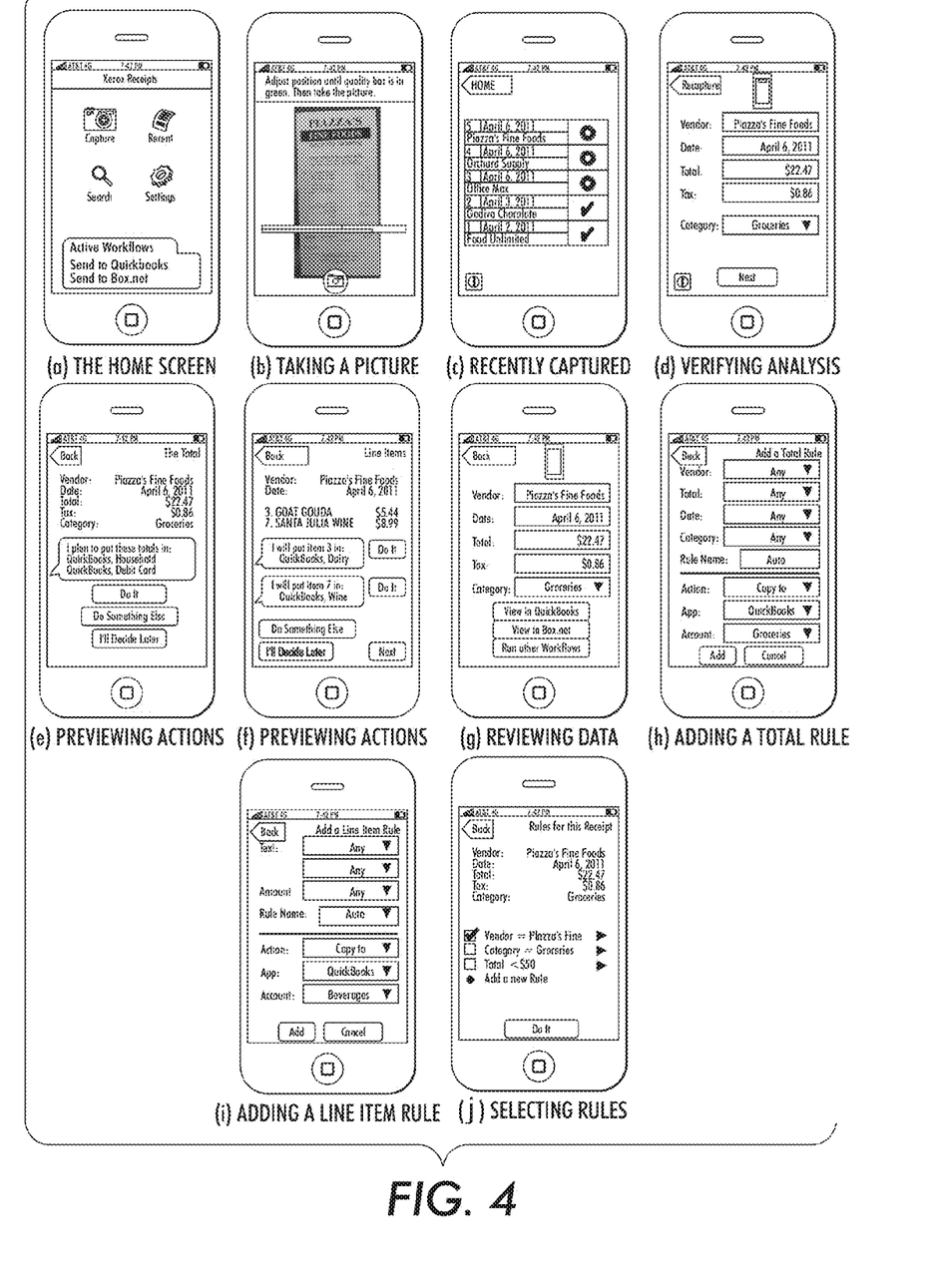
FIGS. 4-5 are exemplary illustrations of a document processing application interface.

With reference to FIG. 4, an exemplary illustration of a user interface is illustrated. The user interface includes a home page in FIG. 4(a) which displays five main functions including capture, review, search, settings, and active workflow. The capture function captures a new receipt with the camera on the smart phone. The review function views recently captured receipts and guide them system, if needed, to finish their processing. The search function uses a search engine to find receipts, particularly less recent receipts, based on key words found on them. The settings function modifies the settings of the application. The active workflow reviews the rules that are currently being applied to receipts and modify them if needed.

FIG. 4(b) shows the user capturing a receipt photo from a smart phone directly from the application. Horizontal colored bars give the user feedback on how well the photo is likely to come out given the current camera position and lighting. FIG. 4(c) shows a time-ordered view of recently captured receipts. Progress indicators show which receipts is actively being processed. A check mark shows a recent that has been processed by the system (although it still may require input or confirmation from the user). The user can click on a receipt to see more information about it, such as the view in (d). FIG. 4(d) shows the information that has been captured from a receipt and allows the user to make corrections if needed, including changes to currency amount, vendor name, or category of purchase. The system may be able to use the corrections as a source of supervised learning feedback to improve its analysis, over time. FIG. 4(e) summarizes what the system plans to do with the information from a receipt. The user may want to look at this information during early experiences with the system to make sure that the rules are achieving the user's goals. Here the system plans to put the receipt totals into two different QUICKBOOKS® account tables, called "Household" and "Debit Card".

FIG. 4(f) is similar to (e) except that it shows actions that the system proposes to take on individual line items. Here it proposes to put item 3 in QUICKBOOKS® in the Dairy account while putting item 7 in QUICKBOOKS® in the Wine account. FIG. 4(g) is similar to (e) except that it is shown for a receipt where processing has all been done. Here the goal is to let the user review what has been done and to and information from this receipt in other applications (e.g., the appropriate rows in QUICKBOOKS® or GOOGLE DOCS® or BOX.NET® where the information has been placed). FIG. 4(h) is a screen the user can visit as part of the Settings or Active Workflows actions on the home screen. This screen allows the user to add a new rule about what to do with the total amount for a given category of receipts. The rule can be conditional on a number of different factors including the vendor from which a purchase was made, the amount of the total, the date of the purchase, and the category of purchase. The actions that can be taken include copying data, adding an entry, sending an email, or text message, computing a balance and mailing it to fellow employees and so on. The rule can specify what application it will contact with the information and what account within that application should be updated.

FIG. 4(i) is similar to (h), except that the rule applies to a line item instead of total amount. Here, the rule may trigger off of information available from the line item itself, such as the text that appears on that line item in a receipt from a particular vendor. It may also depend on the amount of the item. FIG. 4(j) shows a screen that might be used to show the rules that are relevant to the current receipt and to give the user a way to view those rules and select which ones should apply to this receipt and similar receipts in the future.

Figure 5:
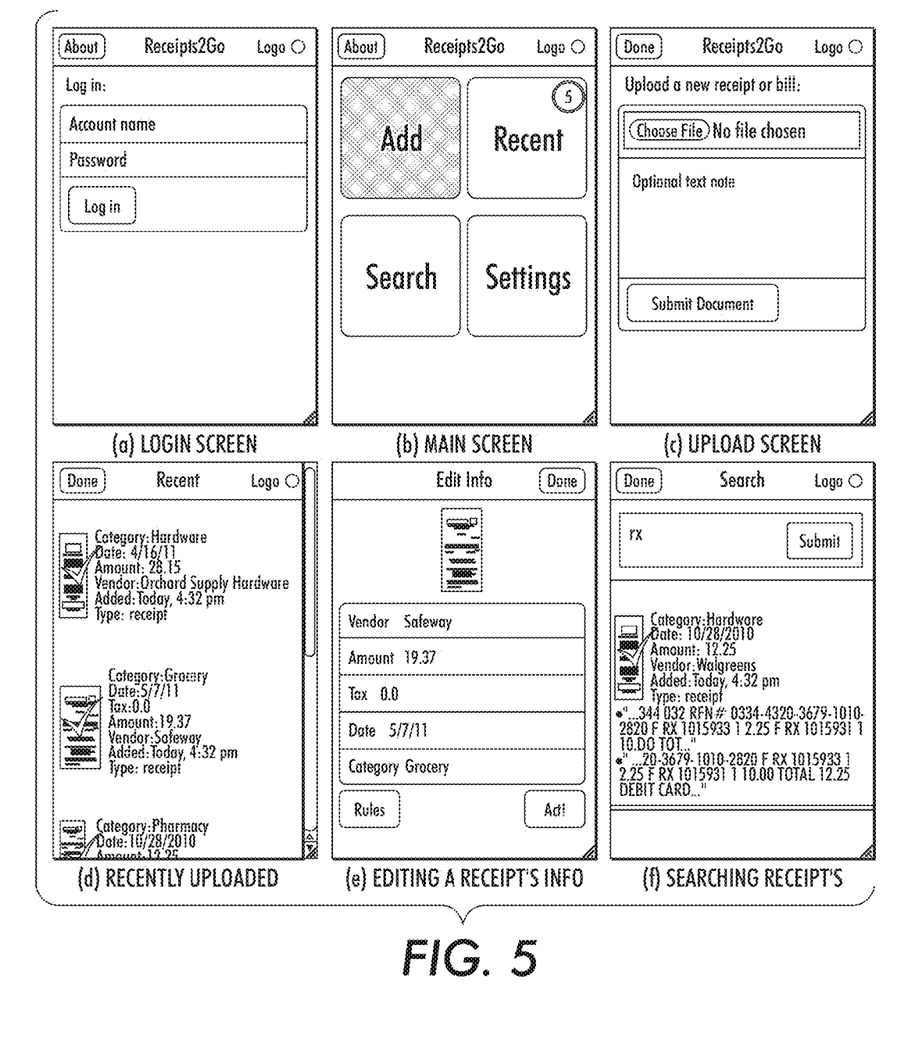

FIG. 5 illustrates an exemplary illustration of an HTML5 application. FIG. 5(a) shows the login screen. Successful login returns a secure limited-time cookie (initially, 30 minutes) to the browser which subsequent calls to the server use to authenticate. FIG. 5(b) shows the main screen, with four large buttons to add new receipts, review pending receipts, search uploaded receipts, and a fourth catch-all to perform housekeeping activities like updating vendor and category lists. FIG. 5(c) show the screen which allows upload of an image of a new receipt to the service. An optional text note can be added to the receipt, if desired.

FIG. 5(d) shows a view of recently uploaded receipts. Receipts which have been fully processed are shown with a green checkmark; receipts requiring further attention from the user are shown with a yellow question mark. FIG. 5(e) shows the information-editing panel for a particular receipt. Values can be corrected or added, rules can be added or edited, and the "Act!" button will cause the appropriate rules to be invoked. FIG. 5(f) shows the search interface. Search strings are found in the database, and all matching receipts are shown along with the text which matched the query.

Figure 6:
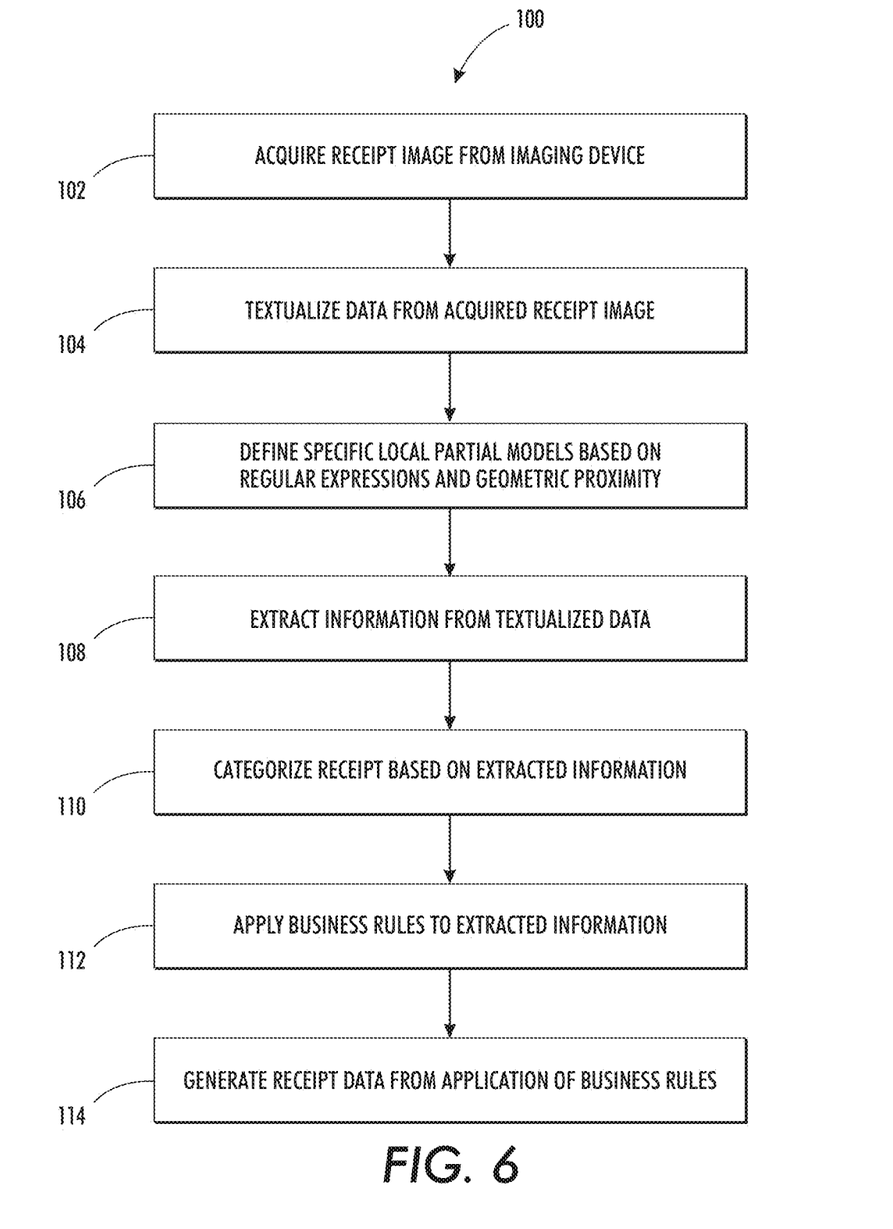
FIG. 6 is a block diagram of a method for processing documents.

With reference to FIG. 6, a method 100 for document processing is illustrated. In a step 102, a receipt image is acquired from an imaging device. Data acquired from the acquired receipt data is textualized in a step 104. In a step 106, specific local partial models based on regular expressions and geometric proximity are defined. In a step 108, information is extracted from the textualized data according to the local partial models. The receipt is categorized based on the extracted information in a step 110. In a step 112, rules are applied to the extracted information. Receipt data is generated from the application of the rules in a step 114.

Figure 7:
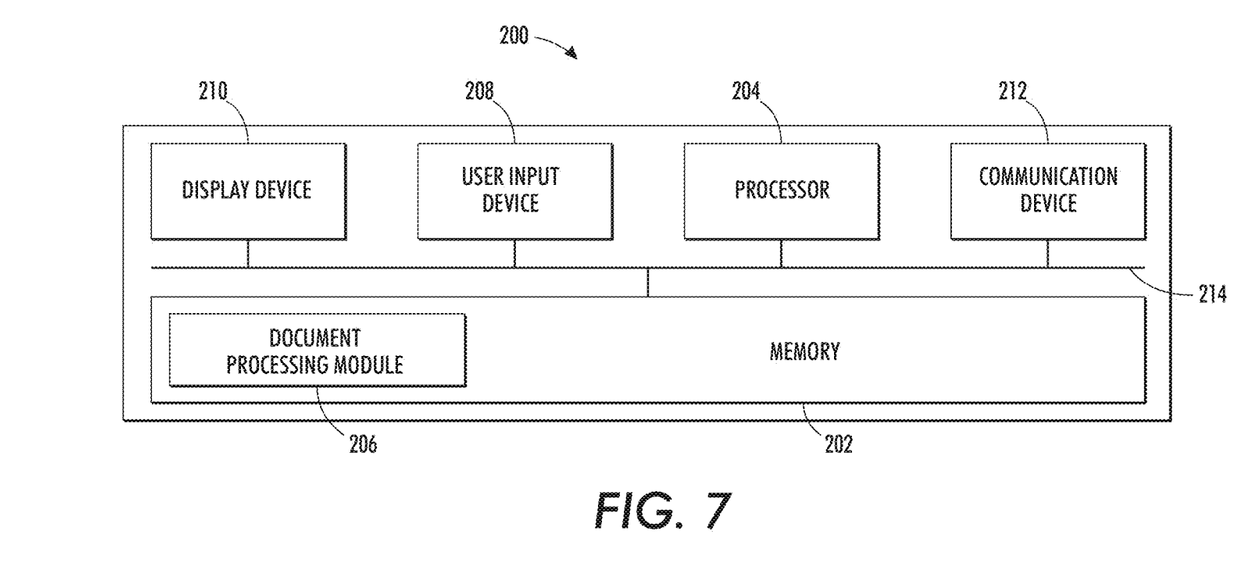
FIG. 7 is another illustration of a document processing system.

With reference to FIG. 7, a document processing system 200 includes at least one memory 202 and at least one processor 204. The memory 202 includes a document processing module 206 comprised of processor executable instructions that perform the method 100 of FIG. 6. The memory 202 further includes processor executable instructions that extract pieces of data from documents, without a model of which specific document forms would be encountered. Specifically, the executable instructions define specific local partial models based on regular expressions and geometric proximity and utilize those partial models to identify specific pieces of data peculiar to the document genre. During use of the system 200, the processor 204 executes the processor executable instructions to extract data from the document image. In this way, the processor 204 is programmed to perform the method 100 of FIG. 6.

The system 200 can further include, or be operatively connected with, one or more user input devices (e.g., mouse, keyboard, etc.) 208 for receiving user input to control the system 200. For example, the user input devices 208 can be employed to create and/or otherwise specify rules, categories, edits, and the like. Further, the system 200 can further include, or be operatively connected with, one or more display devices 210 for displaying output generated by the system 200.

An optional communication device 212 allows the system 200 to communicate with other systems, for example, over a communications network, such as the Internet, a local area network, a wide area network, and the like. At least one system buses 214 of the system 200 interconnect components thereof, such as the memory 202 and the processor 204.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), an FPGA, and the like; a user input device includes one or more of a mouse, a keyboard, a touch screen display, one or more buttons, one or more switches, one or more toggles, and the like; a database includes one or more memories; and a display device includes one or more of a LCD display, an LED display, a plasma display, a projection display, a touch screen display, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for processing an electronic image acquired by an imaging device, said method comprising:
    textualizing data from the acquired image;
    defining specific local partial models of the acquired image based on regular expressions and geometric proximity, the defining including,
    applying context free regular expression patterns to identify key phrase entities and related entities;
    grouping the key phrase entities with the related entities when a specified geometric relationship between the key phrase entities and the related entities is found;
    extracting information from the textualized data according to the local partial models;
    classifying the image as a receipt image;
    in response to the classification of the image as being a receipt image:
        applying receipt-specific rules to the extracted information; and
        generating receipt data from the application of the receipt-specific rules;
    wherein the method is performed using at least one processing device; and
    wherein the applied receipt-specific rules include user defined rules specified during operation of the imaging device.

2. The method according to claim 1, wherein the specific local partial models include a region containing a key phrase entity and a related entity grouped with the key phrase entity.

3. The method according to claim 1, wherein the applied receipt-specific rules include category based rules.

4. The method according to claim 1, wherein the receipt data is exported to an external service application.

5. The method according to claim 1, wherein the extraction of information is accomplished without prior knowledge of a model layout of the overall receipt image.

6. The method according to claim 1, wherein the specified geometric relationship includes one of: (i) one of the related entities being above the corresponding key phrase entity, (ii) one of the related entities being below the corresponding key phrase entity, (iii) one of the related entities being right of the corresponding key phrase entity, and (iv) one of the related entities being left of the corresponding key phrase entity, and wherein the specified geometric relationship of (i)-(iv) assists in identifying an intended meaning of a specific key phrase entity and a specific related entity.

7. The method according to claim 1, wherein the user defined rules are determined by a user selection from a list of rules.

8. The method according to claim 1, wherein the generating the receipt data includes assigning a vendor based on a telephone number.

9. The method according to claim 1, wherein the image is classified as a receipt image based on a categorization score, and the categorization score is based on:
    features;
    textual keywords; and
    factoid patterns.

10. The method according to claim 1, further comprising:
    presenting a summarization of a plan for the generated receipt data to the user.

11. The method according to claim 1, wherein the generating the receipt data includes assigning a vendor based on a URL (Uniform Resource Locator).

12. The method according to claim 1, wherein the receipt-specific rules include a rule to locate a currency amount tagged with a currency amount key phrase including the word "total" that is lowest on the receipt image, and identifies the currency amount as a total amount of the receipt.

13. A system for processing documents, said system comprising:
    at least one processor programmed to:
    acquire an image of a paper document with an imaging device;
    textualize data from the acquired document image;
    define specific local partial models of the acquired document image based on regular expressions and geometric proximity, the define operation further programmed to,
    apply context free regular expression patterns to identify key phrase entities and related entities,
    group the key phrase entities with the related entities when a specified geometric relationship between the key phrase entities and the related entities is found;
    extract information from the textualized data according to the local partial models;
    classify the image of a paper document as being a receipt image;
    in response to the classification of the image of the paper document as being a receipt image:
        apply receipt-specific rules to the extracted information; and
        generate document data from the application of the receipt-specific rules; and
    wherein the applied receipt-specific rules include user defined rules specified during operation of the imaging device.

14. The system according to claim 13, wherein the specific local partial models include a region containing a key phrase entity and a related entity grouped with the key phrase entity.

15. The system according to claim 13, wherein the applied receipt-specific rules include category based rules.

16. The system according to claim 13, wherein the document data is exported to an external service application.

17. The system according to claim 13, wherein extraction of information is accomplished without prior knowledge of a model layout of the overall document image.

18. The system according to claim 13, wherein the specified geometric relationship includes one of: (i) one of the related entities being above the corresponding key phrase entity, (ii) one of the related entities being below the corresponding key phrase entity, (iii) one of the related entities being right of the corresponding key phrase entity, and (iv) one of the related entities being left of the corresponding key phrase entity, and wherein the specified geometric relationship of (i)-(iv) assists in identifying an intended meaning of a specific key phrase entity and a specific related entity.

19. The system according to claim 13, wherein the at least one processor is further programed to receive the receipt-specific rules from a user selection from a list of receipt-specific rules.

20. The system according to claim 13, wherein the classify operation is further programed to classify the image of the paper document as an invoice.

21. The system according to claim 13, wherein the generate document data operation is further programed to assign a vendor based on a URL (Uniform Resource Locator).

22. A system for processing documents, said system comprising:
at least one imaging device which generates an image of a paper document; and
at least one processor programmed to:
acquire the image of a paper document from the at least one imaging device;
textualize data from the acquired document image;
define specific local partial models of the acquired document image based on regular expressions and geometric proximity, the define operation further programmed to,
apply context free regular expression patterns to identify key phrase entities and related entities,
group the key phrase entities with the related entities when a specified geometric relationship between the key phrase entities and the related entities is found;
extract information from the textualized data according to the local partial models;
classify the image of a paper document as being a receipt image;
in response to the classification of the image of the paper document as being a receipt image:
apply receipt-specific rules to the extracted information; and
generate document data from the application of the receipt-specific rules; and
wherein the applied receipt-specific rules include user defined rules specified during operation of an imaging device of the at least one imaging devices.

23. The system according to claim 22, wherein the specific local partial models include a region containing a key phrase entity and a related entity grouped with the key phrase entity.

24. The system according to claim 22, wherein the applied receipt-specific rules include category based rules.

25. The system according to claim 22, wherein the step of textualizing the data further includes at least one of orientation correction, de-skewing, normalization, and removal of background noise and artifacts.

26. The system according to claim 22, wherein extraction of information is accomplished without prior knowledge of a model layout of the overall document image.

27. The system according to claim 22, wherein the specified geometric relationship includes one of: (i) one of the related entities being above the corresponding key phrase entity, (ii) one of the related entities being below the corresponding key phrase entity, (iii) one of the related entities being right of the corresponding key phrase entity, and (iv) one of the related entities being left of the corresponding key phrase entity, and wherein the specified geometric relationship of (i)-(iv) assists in identifying an intended meaning of a specific key phrase entity and a specific related entity.

* * * * *